US011077620B2

(12) United States Patent
Chen et al.

(10) Patent No.: US 11,077,620 B2
(45) Date of Patent: Aug. 3, 2021

(54) DEPTH RECONSTRUCTION IN ADDITIVE FABRICATION

(71) Applicant: Inkbit, LLC, Medford, MA (US)

(72) Inventors: Desai Chen, Arlington, MA (US); Wojciech Matusik, Lexington, MA (US)

(73) Assignee: Inkbit, LLC, Medford, MA (US)

( * ) Notice: Subject to any disclaimer, the term of this patent is extended or adjusted under 35 U.S.C. 154(b) by 0 days.

(21) Appl. No.: 16/737,142

(22) Filed: Jan. 8, 2020

(65) Prior Publication Data

US 2020/0223147 A1 Jul. 16, 2020

Related U.S. Application Data

(60) Provisional application No. 62/789,764, filed on Jan. 8, 2019.

(51) Int. Cl.
| | |
|---|---|
| *B29C 64/393* | (2017.01) |
| *B33Y 50/02* | (2015.01) |
| *G06T 7/521* | (2017.01) |
| *G01B 9/02* | (2006.01) |
| *G06N 3/02* | (2006.01) |

(52) U.S. Cl.
CPC ............ *B29C 64/393* (2017.08); *B33Y 50/02* (2014.12); *G01B 9/02091* (2013.01); *G06N 3/02* (2013.01); *G06T 7/521* (2017.01); *G06T 2207/10028* (2013.01); *G06T 2207/10101* (2013.01)

(58) Field of Classification Search
None
See application file for complete search history.

(56) References Cited

U.S. PATENT DOCUMENTS

| | | |
|---|---|---|
| 5,460,758 A | 10/1995 | Langer et al. |
| 6,492,651 B2 | 12/2002 | Kerekes |
| 9,562,759 B2 | 2/2017 | Vogler et al. |
| 9,952,506 B2 | 4/2018 | Arai et al. |
| 10,011,071 B2 | 7/2018 | Batchelder |
| 10,252,466 B2 | 4/2019 | Ramos et al. |
| 10,456,984 B2 | 10/2019 | Matusik et al. |

(Continued)

FOREIGN PATENT DOCUMENTS

| | | |
|---|---|---|
| EP | 3459716 A1 | 3/2019 |
| JP | 2014098555 A | 5/2014 |

(Continued)

OTHER PUBLICATIONS

International Search Report dated Apr. 24, 2020 in PCT Application No. PCT/US2020/012725.

(Continued)

*Primary Examiner* — Delomia L Gilliard
(74) *Attorney, Agent, or Firm* — Occhiuti & Rohlicek LLP

(57) ABSTRACT

A method for determining estimated depth data for an object includes scanning the object to produce scan data corresponding to a surface region of the object using a first scanning process, configuring an artificial neural network with first configuration data corresponding to the first scanning process, and providing the scan data as an input to the configured artificial neural network to yield the estimated depth data as an output, the estimated depth data representing a location of a part of the object in the surface region.

19 Claims, 12 Drawing Sheets

Volumetric OCT data

Reconstructed surface

(56) References Cited

U.S. PATENT DOCUMENTS

| | | | |
|---|---|---|---|
| 2002/0104973 A1 | 8/2002 | Kerekes | |
| 2004/0085416 A1 | 5/2004 | Kent | |
| 2004/0114002 A1 | 6/2004 | Kosugi et al. | |
| 2004/0173946 A1 | 9/2004 | Pfeifer et al. | |
| 2006/0007254 A1 | 1/2006 | Tanno et al. | |
| 2007/0106172 A1* | 5/2007 | Abreu | A61B 5/0002 600/549 |
| 2007/0241482 A1 | 10/2007 | Giller et al. | |
| 2008/0124475 A1 | 5/2008 | Kritchman | |
| 2009/0073407 A1 | 3/2009 | Okita | |
| 2009/0105605 A1* | 4/2009 | Abreu | A61B 5/0046 600/549 |
| 2009/0220895 A1 | 9/2009 | Garza et al. | |
| 2009/0279089 A1 | 11/2009 | Wang | |
| 2009/0279098 A1 | 11/2009 | Ohbayashi et al. | |
| 2010/0140550 A1 | 6/2010 | Keller et al. | |
| 2010/0158332 A1* | 6/2010 | Rico | A61B 5/4312 382/128 |
| 2012/0275148 A1 | 11/2012 | Yeh et al. | |
| 2013/0182260 A1 | 7/2013 | Bonnema et al. | |
| 2013/0328227 A1 | 12/2013 | McKinnon et al. | |
| 2014/0249663 A1 | 9/2014 | Voillaume | |
| 2014/0300676 A1 | 10/2014 | Miller et al. | |
| 2015/0061178 A1 | 3/2015 | Siniscalchi et al. | |
| 2015/0101134 A1 | 4/2015 | Manz et al. | |
| 2015/0124019 A1 | 5/2015 | Cruz-Uribe et al. | |
| 2015/0352792 A1 | 12/2015 | Kanada | |
| 2016/0018404 A1 | 1/2016 | Iyer et al. | |
| 2016/0023403 A1 | 1/2016 | Ramos et al. | |
| 2016/0101568 A1 | 4/2016 | Mizes et al. | |
| 2016/0157751 A1 | 6/2016 | Mahfouz | |
| 2016/0167301 A1 | 6/2016 | Cole et al. | |
| 2016/0209319 A1 | 7/2016 | Adalsteinsson et al. | |
| 2016/0249836 A1* | 9/2016 | Gulati | G01J 3/36 600/316 |
| 2016/0320771 A1* | 11/2016 | Huang | B33Y 30/00 |
| 2016/0347005 A1 | 12/2016 | Miller | |
| 2017/0021455 A1 | 1/2017 | Dallarosa et al. | |
| 2017/0087766 A1 | 3/2017 | Chung et al. | |
| 2017/0106604 A1 | 4/2017 | Dikovsky et al. | |
| 2017/0120337 A1 | 5/2017 | Kanko et al. | |
| 2017/0143494 A1 | 5/2017 | Mahfouz | |
| 2017/0217103 A1 | 8/2017 | Babaei et al. | |
| 2017/0235293 A1 | 8/2017 | Shapiro et al. | |
| 2017/0355147 A1 | 12/2017 | Buller et al. | |
| 2018/0017501 A1 | 1/2018 | Trenholm et al. | |
| 2018/0036964 A1 | 2/2018 | DehghanNiri et al. | |
| 2018/0056582 A1 | 3/2018 | Matusik et al. | |
| 2018/0071984 A1 | 3/2018 | Lee et al. | |
| 2018/0099333 A1 | 4/2018 | DehghanNiri et al. | |
| 2018/0143147 A1 | 5/2018 | Milner et al. | |
| 2018/0154580 A1 | 6/2018 | Mark | |
| 2018/0169953 A1 | 6/2018 | Matusik et al. | |
| 2018/0194066 A1 | 7/2018 | Ramos et al. | |
| 2018/0273657 A1 | 9/2018 | Wang et al. | |
| 2018/0281067 A1 | 10/2018 | Small et al. | |
| 2018/0297113 A1* | 10/2018 | Preston | B29C 64/165 |
| 2018/0304549 A1 | 10/2018 | Safai et al. | |
| 2018/0311893 A1 | 11/2018 | Choi et al. | |
| 2018/0320006 A1 | 11/2018 | Lee et al. | |
| 2018/0341248 A1 | 11/2018 | Mehr et al. | |
| 2018/0348492 A1 | 12/2018 | Pavlov et al. | |
| 2019/0077921 A1 | 3/2019 | Eckel | |
| 2019/0118300 A1 | 4/2019 | Penny et al. | |
| 2019/0270254 A1 | 9/2019 | Mark et al. | |
| 2019/0271966 A1 | 9/2019 | Coffman et al. | |
| 2019/0322031 A1 | 10/2019 | Kritchman | |
| 2019/0329322 A1 | 10/2019 | Preston et al. | |
| 2019/0346830 A1 | 11/2019 | de Souza Borges Ferreira et al. | |
| 2019/0353767 A1 | 11/2019 | Eberspach et al. | |
| 2020/0004225 A1 | 1/2020 | Buller et al. | |
| 2020/0122388 A1 | 4/2020 | Van Esbroeck et al. | |
| 2020/0143006 A1* | 5/2020 | Matusik | G06N 20/00 |
| 2020/0147888 A1 | 5/2020 | Ramos et al. | |
| 2020/0215761 A1 | 7/2020 | Chen et al. | |

FOREIGN PATENT DOCUMENTS

| | | |
|---|---|---|
| JP | 6220476 B1 | 10/2017 |
| JP | 2018103488 A | 7/2018 |
| KR | 101567281 B1 * | 11/2015 |
| KR | 101567281 B1 | 11/2015 |
| KR | 20180067961 A * | 6/2018 |
| WO | 2003/026876 A2 | 4/2003 |
| WO | 2017066077 A1 | 4/2017 |
| WO | 2018080397 A1 | 5/2018 |
| WO | 2018197376 A1 | 11/2018 |
| WO | 2018209438 A1 | 11/2018 |
| WO | 2019070644 A2 | 4/2019 |
| WO | 2019125970 A1 | 6/2019 |
| WO | 2020123479 A1 | 6/2020 |

OTHER PUBLICATIONS

Alarousu, Erkki, Ahmed AlSaggaf, and Ghassan E. Jabbour. "Online monitoring of printed electronics by spectral-domain optical coherence tomography." Scientific reports 3 (2013): 1562.

Daniel Markl et al: "Automated pharmaceutical tablet coating layer evaluation of optical coherence tomography images", Measurement Science and Technology, IOP, Bristol, GB, vol. 26, No. 3, Feb. 2, 2015 (Feb. 2, 2015), p. 35701, XP020281675, ISSN: 0957-0233, DOI: 10.1088/0957-0233/26/3/035701 [retrieved on Feb. 2, 2015].

Daniel Markl et al: "In-line quality control of moving objects by means of spectral-domain OCT", Optics and Lasers in Engineering, vol. 59, Aug. 1, 2014 (Aug. 1, 2014), pp. 1-10, XP055671920, Amsterdam, NL ISSN: 0143-8166, DOI: 10.1016/j.optlaseng.2014.02.008.

Fischer, Björn, Christian Wolf, and Thomas Hartling. "Large field optical tomography system." In Smart Sensor Phenomena, Technology, Networks, and Systems Integration 2013, vol. 8693, p. 86930P. International Society for Optics and Photonics, 2013.

Huo, Tiancheng, Chengming Wang, Xiao Zhang, Tianyuan Chen, Wenchao Liao, Wenxin Zhang, Shengnan Ai, Jui-Cheng Hsieh, and Ping Xue. "Ultrahigh-speed optical coherence tomography utilizing all-optical 40 MHz swept-source." Journal of biomedical optics 20, No. 3 (2015): 030503.

Klein, Thomas, and Robert Huber. "High-speed OCT light sources and systems." Biomedical optics express 8, No. 2 (2017): 828-859.

Moon, Sucbei, and Dug Young Kim. "Ultra-high-speed optical coherence tomography with a stretched pulse supercontinuum source." Optics Express 14, No. 24 (2006): 11575-11584.

Park, Yongwoo, Tae-Jung Ahn, Jean-Claude Kieffer, and José Azaña. "Optical frequency domain reflectometry based on real-time Fourier transformation." Optics express 15, No. 8 (2007): 4597-4616.

Wieser, Wolfgang, Benjamin R. Biedermann, Thomas Klein, Christoph M. Eigenwillig, and Robert Huber. "Multi-megahertz OCT: High quality 3D imaging at 20 million A-scans and 4.5 GVoxels per second." Optics express 18, No. 14 (2010): 14685-14704.

Xu, Jingjiang, Xiaoming Wei, Luoqin Yu, Chi Zhang, Jianbing Xu, K. K. Y. Wong, and Kevin K. Tsia. "Performance of megahertz amplified optical time-stretch optical coherence tomography (AOT-OCT)." Optics express 22, No. 19 (2014): 22498-22512.

Zhou, Chao, Aneesh Alex, Janarthanan Rasakanthan, and Yutao Ma. "Space-division multiplexing optical coherence tomography." Optics express 21, No. 16 (2013): 19219-19227.

Blanken, Lennart, Robin de Rozario, Jurgen van Zundert, Sjirk Koekebakker, Maarten Steinbuch, and Tom Oomen. "Advanced feedforward and learning control for mechatronic systems." In Proc. 3rd DSPE Conf. Prec. Mech, pp. 79-86. 2016.

Blanken, Lennart. "Learning and repetitive control for complex systems: with application to large format printers." (2019).

Oomen, Tom. "Advanced motion control for next-generation precision mechatronics: Challenges for control, identification, and teaming." In IEEJ International Workshop on Sensing, Actuation, Motion Control, and Optimization (SAMCON), pp. 1-12. 2017.

Sitthi-Amorn, Pitchaya, Javier E. Ramos, Yuwang Wangy, Joyce Kwan, Justin Lan, Wenshou Wang, and Wojciech Matusik. "MultiFab:

(56) References Cited

OTHER PUBLICATIONS a machine vision assisted platform for multi-material 3D printing." ACM Transactions on Graphics (TOG) 34, No. 4 (2015): 129.
Kulik, Eduard A., and Patrick Calahan. "Laser profilometry of polymeric materials." Cells and Materials 7, No. 2 (1997): 3.
Qi, X.; Chen, G.; Li, Y.; Cheng, X.; and Li, C., "Applying Neural-Network Based Machine Learning to Addirive Manufacturing: Current Applications, Challenges, and Future Perspectives", Jul. 29, 2018, Engineering 5 (2019) 721-729. (Year: 2019).
DebRoy, T.; Wei, H.L.; Zuback, J.S.; Muhkerjee, T.; Elmer, J.W.; Milewski, J.O.; Beese, A.M.; Wilson-Heid, A.; Ded, A.; and Zhang, W., "Additive manufacturing of metallic components—Process, structure and properties", Jul. 3, 2017, Progress in Materials Science 92 (2018) 112-224. (Year: 2017).

\* cited by examiner

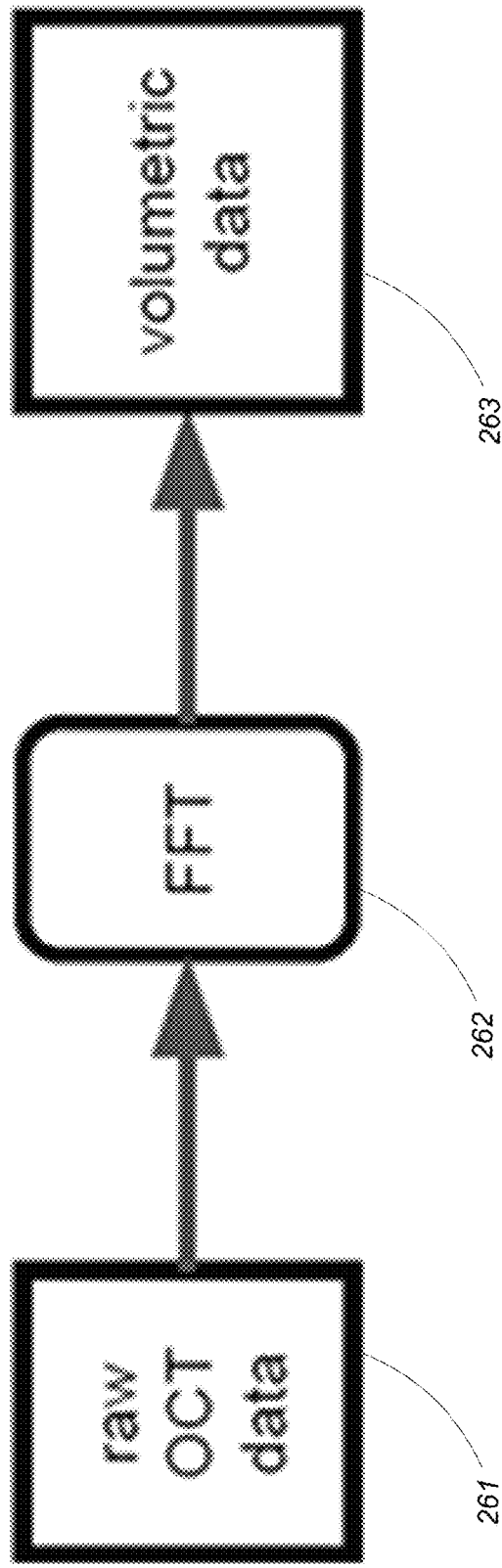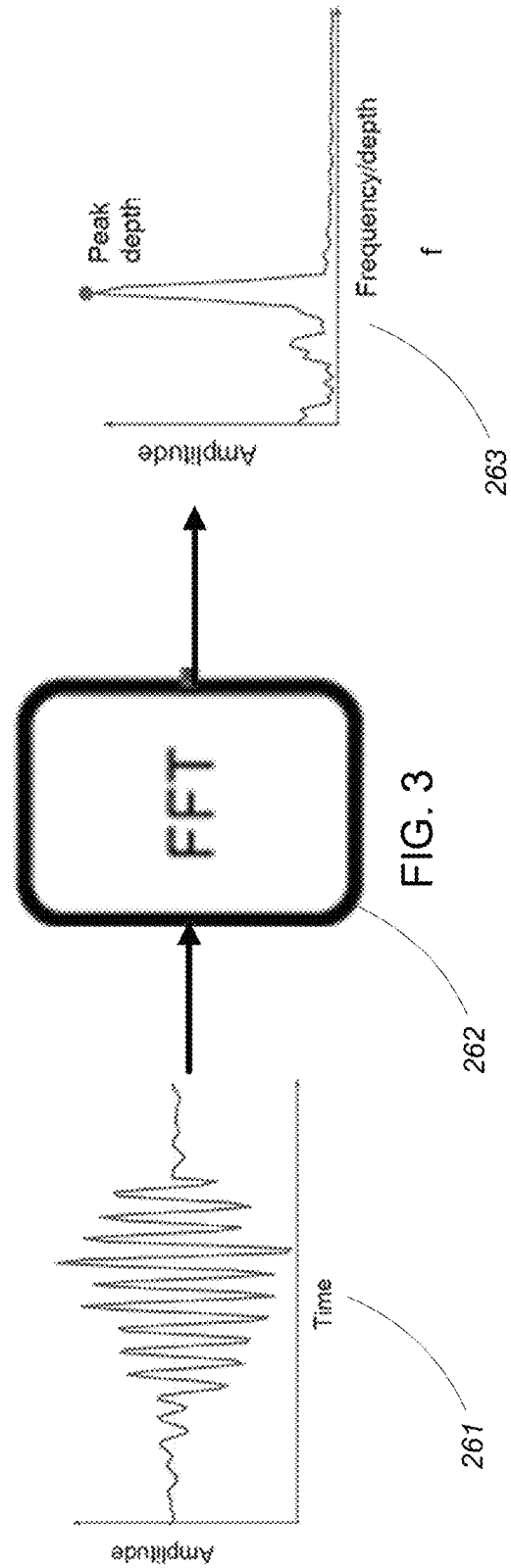

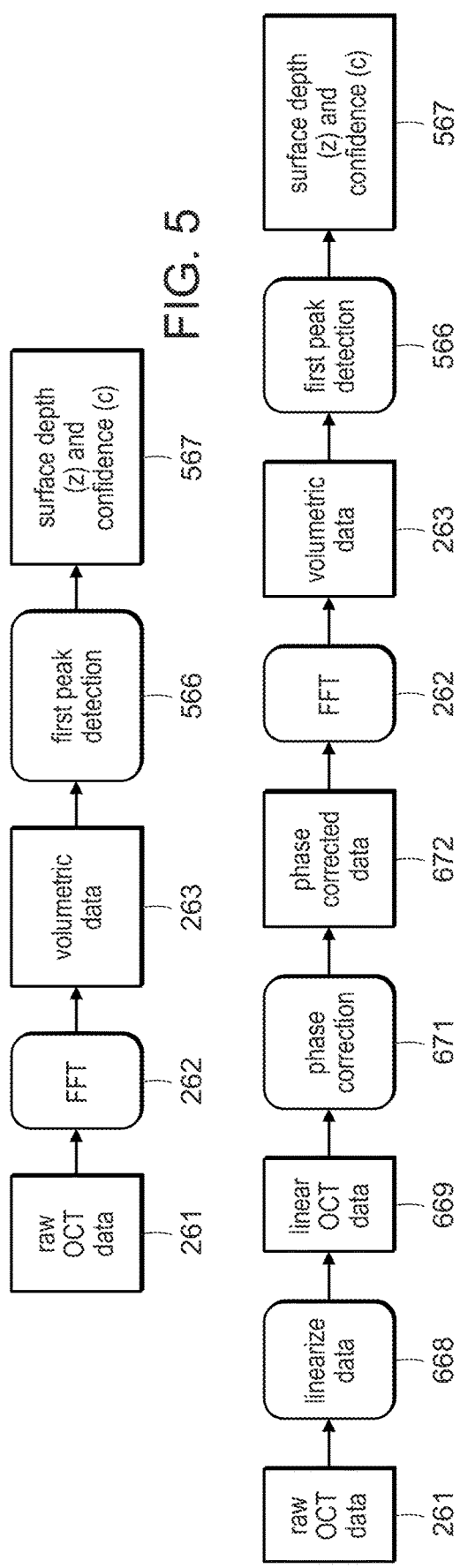
FIG. 5
FIG. 6
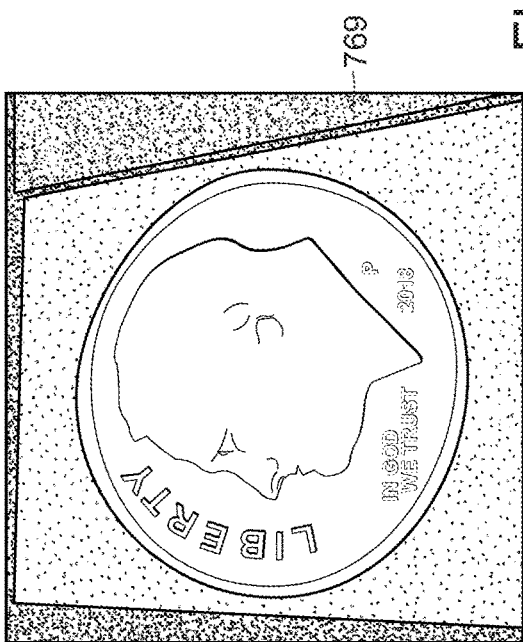
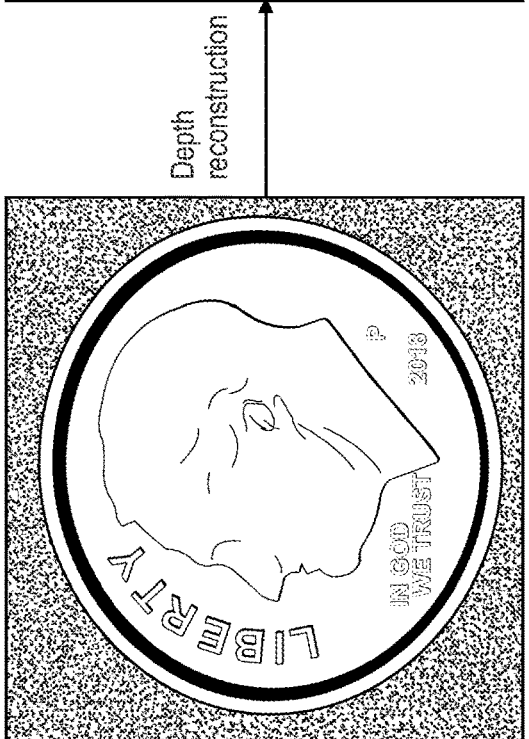
FIG. 7

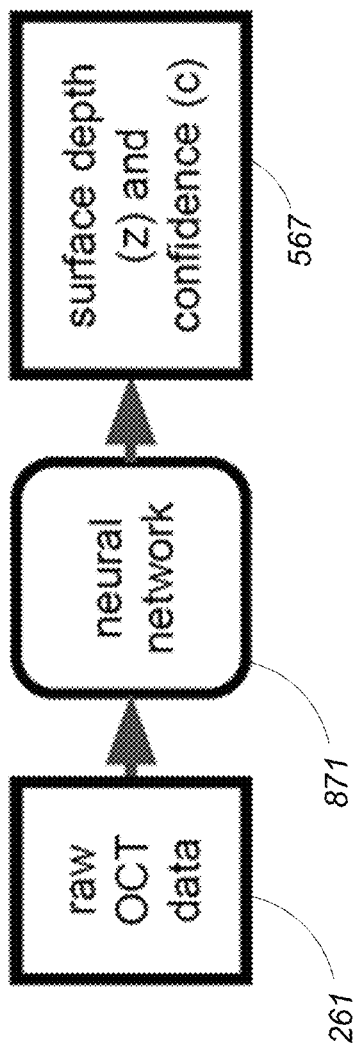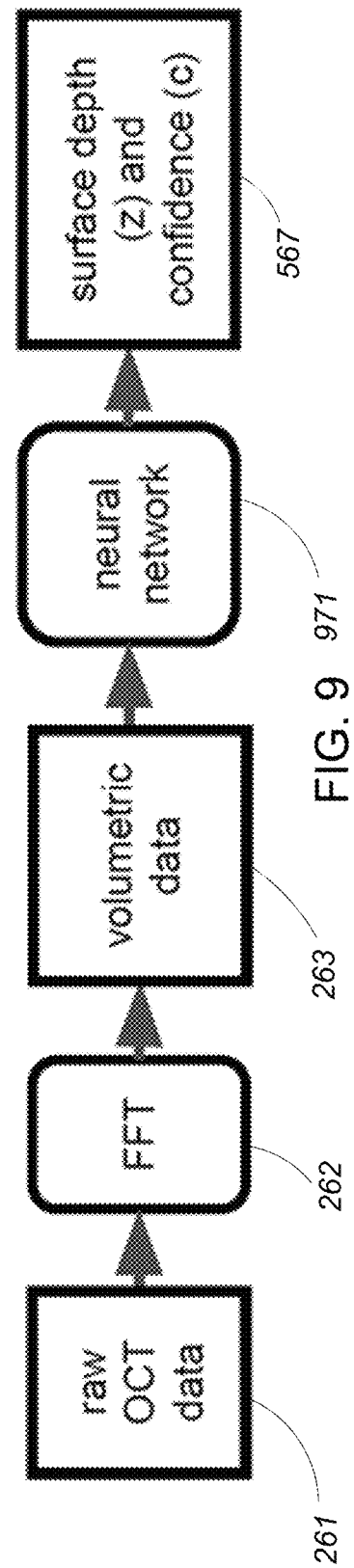

DEPTH RECONSTRUCTION IN ADDITIVE FABRICATION

CROSS-REFERENCES TO RELATED APPLICATIONS

This application claims the benefit of U.S. Provisional Application No. 62/789,764 filed Jan. 8, 2019, the contents of which are incorporated herein by reference.

BACKGROUND OF THE INVENTION

This invention relates to the precision methods and systems used in additive fabrication.

Additive fabrication, also referred to as 3D printing, refers to a relatively wide class of techniques for producing parts according to a computer-controlled process, generally to match a desired 3D specification, for example, a solid model. A class of fabrication techniques jets material for deposition on a partially fabricated object using inkjet printing technologies. The jetted material is typically UV cured shortly after it deposited, forming thin layers of cured material.

SUMMARY OF THE INVENTION

Certain additive fabrication systems use Optical Coherence Tomography (OCT) to capture volumetric data related to an object under fabrication. The captured volumetric data can be used by a reconstruction algorithm to produce a surface or depth map for a boundary of the object under fabrication (e.g., topmost surface of the object). One way of computing the surface boundary uses an image processing method such as peak detection.

Aspects described herein replace a some or all of the intermediate steps in the process of going from raw OCT data to a surface or depth map (sometimes referred to as 2.5D representation) of the scanned geometry with a machine learning model represented as a neural network. The reconstructed surface or depth map can be used for a variety of computer vision applications such as part inspection. The algorithm and system can also be used for a feedback loop in additive manufacturing systems.

In a general aspect, a method for determining estimated depth data for an object includes scanning the object to produce scan data corresponding to a surface region of the object using a first scanning process, configuring an artificial neural network with first configuration data corresponding to the first scanning process, and providing the scan data as an input to the configured artificial neural network to yield the estimated depth data as an output, the estimated depth data representing a location of a part of the object in the surface region.

Aspects may include one or more of the following features.

The object may include an object under 3D additive fabrication according to a first fabrication process. The first configuration data may correspond to the first scanning process as well as the first fabrication process. The method may include configuring an artificial neural network with first configuration data including selecting said first configuration data from a set of available configuration data each associated with a different scanning and/or fabrication process.

The method may include determining expected depth data for the surface region of the object and providing the expected depth data with the scan data to the configured artificial neural network. The expected depth data may include a range of expected depths. Scanning the object may include optically scanning the object at the location on the surface of the object. Scanning the object may include optically scanning the object over a number of locations on the surface region of the object.

Scanning the object may include scanning the object using optical coherence tomography. Scanning the object may include processing raw scan data according to one or more of (1) a linearization procedure, (2) a spectral analysis procedure, and (3) a phase correction procedure to produce the scan data. The method may include transforming the scan data from a time domain representation to a frequency domain representation prior to providing the scan data as input to the artificial neural network.

The configured artificial neural network may yields a confidence measure associated with the estimated depth data. The method may include providing scan data for a spatial neighborhood associated with the surface region of the object as input to the configured artificial neural network. The spatial neighborhood may include a number of parts of the object in the surface region.

In another general aspect, a system for determining estimated depth data for an object includes a sensor for scanning the object to produce scan data corresponding to a surface region of the object using a first scanning process, an artificial neural network configured with first configuration data corresponding to the first scanning process, the artificial neural network configured to determine the estimated depth data representing a location of a part of the object in the surface region. The artificial neural network has one or more inputs for receiving the scan data and an output for providing an estimated depth data.

In another general aspect, software stored on a non-transitory computer-readable medium includes instructions for causing a processor to cause a sensor to scan the object to produce scan data corresponding to a surface region of the object using a first scanning process configure an artificial neural network with first configuration data corresponding to the first scanning process, and provide the scan data as an input to the configured artificial neural network to yield the estimated depth data as an output, the estimated depth data representing a location of a part of the object in the surface region.

In another general aspect, a method for determining estimated depth data for an object includes scanning the object to produce scan data corresponding to a surface region of the object using a first scanning process, configuring a first artificial neural network with first configuration data corresponding to the first scanning process, configuring a second artificial neural network with second configuration data corresponding to the first scanning process, providing the scan data as an input to the configured first artificial neural network to yield volumetric data representing a location of a part of the object in the surface region, and providing the volumetric data to the configured second neural network to yield the estimated depth data as an output, the estimated depth data representing the location of the part of the object in the surface region.

Aspects may include one or more of the following features.

The method may include determining expected depth data for the surface region of the object and providing the expected depth data with the scan data to the configured second artificial neural network. The expected depth data may include a range of expected depths.

In another general aspect, a method for configuring an artificial neural network for determining estimated depth data for an object includes determining training data including scan data for a number of object and corresponding reference depth data, processing the training data to form configuration data for an artificial neural network, and providing the training data for use in a method for determining estimated depth data.

Aspects may have one or more of the following advantages over conventional techniques. The use of an artificial neural network allows for a model can be automatically trained for different scanning processes and materials. As a result, the parameter tuning that may be required in conventional processing pipelines may be avoided. The model may be simpler and require fewer computation steps than conventional processing pipelines (i.e., the model may increase computational efficiency). The model may produce more accurate and higher resolution results.

Other features and advantages of the invention are apparent from the following description, and from the claims.

BRIEF DESCRIPTION OF THE DRAWINGS

FIG. 2 is a workflow for determining volumetric intensity data from raw OCT data.

FIG. 3 is another representation of the workflow of FIG. 2.

FIG. 5 is a first workflow for determining surface depth from raw OCT data.

FIG. 6 is a second workflow for determining surface depth from raw OCT data.

FIG. 7 is an example of a transformation of a volumetric intensity profile to a surface depth profile.

FIG. 8 is a first, fully neural network-based workflow for determining surface depth from raw OCT data.

FIG. 9 is a second, partially neural network-based workflow for determining surface depth from raw OCT data.

DETAILED DESCRIPTION

1 Additive Manufacturing System Overview

Figure 1:
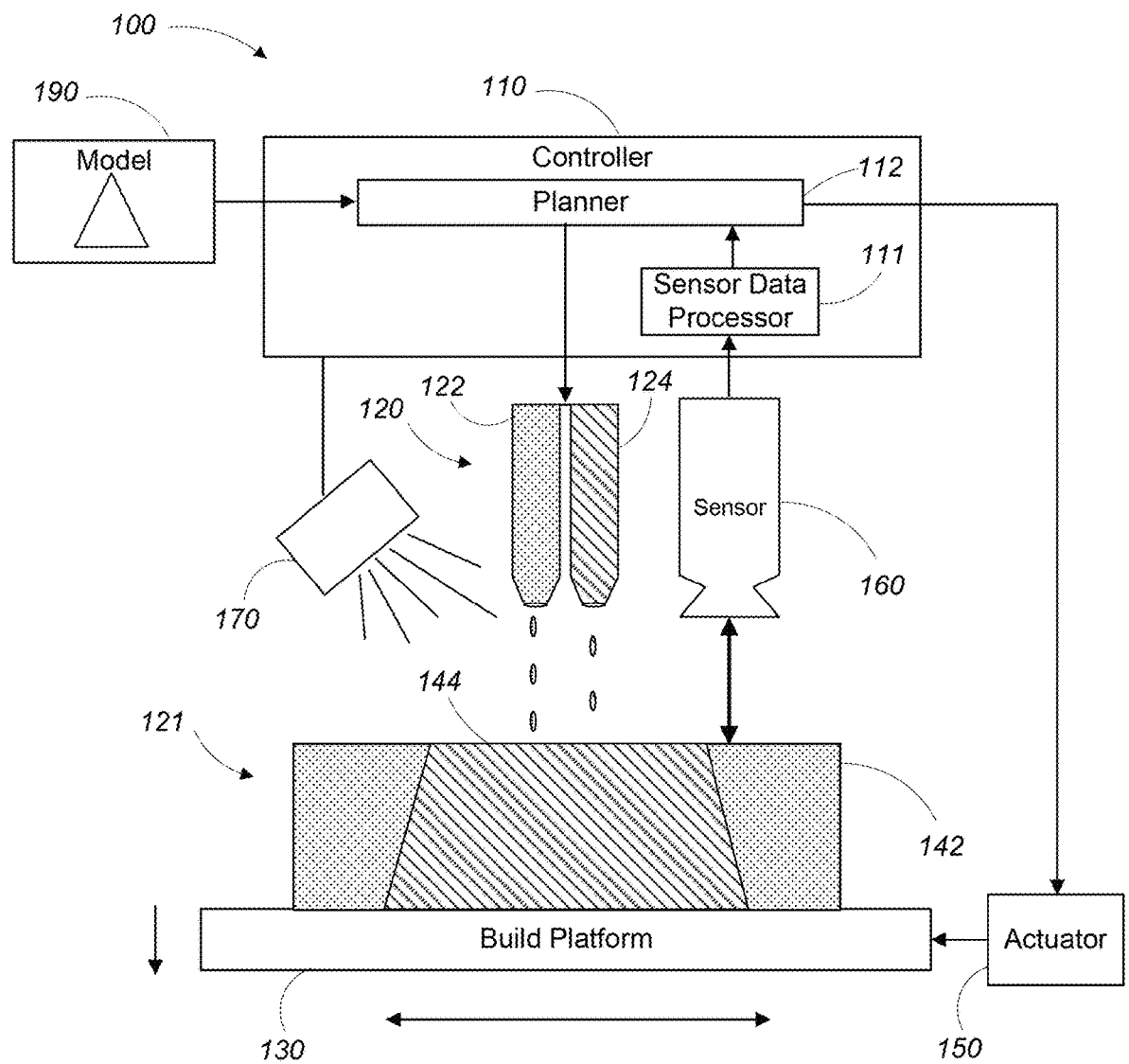
FIG. 1 is a 3D printing system.

The description below relates additive fabrication, for example using a jetting-based 3D printer 100 shown in FIG. 1. As is described in greater detail below, the printer 100 includes a controller 110 that processes data from a sensor 160 using a sensor data processor 111 to determine surface data related to an object under fabrication 121. That surface data is used as feedback by a planner 112 to determine future printing operations. The sensor data processor 111 may use one of any number of the machine learning-based methodologies described herein to determine the surface data more efficiently and/or more accurately.

The printer 100 uses jets 120 (inkjets) to emit material for deposition of layers on a partially fabricated object. In the printer illustrated in FIG. 1, the object is fabricated on a build platform 130, which is controlled to move related to the jets (i.e., along an x-y plane) in a raster-like pattern to form successive layers, and in this example also to move relative to the jets (i.e., along a z-axis) to maintain a desired separation of the jets and the surface of the partially-fabricated object 121. As illustrated, there are multiple jets 122, 124, with one jet 122 being used to emit a support material to form a support structure 142 of the object, and another jet 124 being used to emit built material to form the object 144 itself. For materials for which curing is triggered by an excitation signal, such as an ultraviolet illumination, a curing signal generator 170 (e.g., a UV lamp) triggers curing of the material shortly after it is jetted onto the object. In other embodiments, multiple different materials may be used, for example, with a separate jet being used for each material. Yet other implementations do not necessarily use an excitation signal (e.g., optical, RF, etc.) and rather the curing is triggered chemically, for example, by mixing multiple components before jetting, or jetting separate components that mix and trigger curing on the object. Note that in some examples, after the additive deposition is complete, the object may be subject to further curing (e.g., to complete the curing), for example, by further exposing the object to UV radiation.

A sensor 160 is used to determine physical characteristics of the partially fabricated object, including one or more of the surface geometry (e.g., a depth map characterizing the thickness/depth of the partially fabricated object), subsurface (e.g., in the near surface including, for example, 10s or 100s of deposited layers) characteristics. The characteristics that may be sensed can include one or more of a material density, material identification, and a curing state. While various types of sensing can be used, examples described herein relate to the use of optical coherence tomography (OCT) to determine depth and volumetric information related to the object being fabricated.

The controller 110 uses the model 190 of the object to be fabricated to control motion of the build platform 130 using a motion actuator 150 (e.g., providing three degrees of motion) and control the emission of material from the jets 120 according to the non-contact feedback of the object characteristics determined via the sensor 160. Use of the feedback arrangement can produce a precision object by compensating for inherent unpredictable aspects of jetting (e.g., clogging of jet orifices) and unpredictable material changes after deposition, including for example, flowing, mixing, absorption, and curing of the jetted materials.

The sensor 160 is positioned above the object under fabrication 121 and measures characteristics of the object 121 within a given working range (e.g., a 3D volume). The measurements are associated with a three-dimensional (i.e., x, y, z) coordinate system where the x and y axes are treated as spatial axes and the z axis is a depth axis.

In some examples, the sensor 160 measures the volume of the object under fabrication 121 in its own coordinate system. The sensor's coordinate system might be a projective space, or the lens system might have distortion, even if the system is meant to be orthographic. As such, it may be the case that the measured volume is transformed from the coordinate space of the sensor 160 to the world coordinate space (e.g., a Euclidean, metric coordinate system). A calibration process may be used to establish mapping between these two spaces.

2 Sensor Data Processing

In some examples, the printer 100 fabricates the object 121 in steps, or "layers." For each layer, the controller 110 causes the platform 130 to move to a position on the z-axis. The controller 110 then causes the platform 130 to move to a number of positions on the x-y plane. At each (x,y,z) position the controller 110 causes the jets 120 to deposit an amount of material that is determined by a planner 112 based at least in part on the model 190 and a depth map of the object under fabrication 121 determined by a sensor data processor 111 of the controller 110.

2.1 Volumetric Intensity Data Determination

Referring also to FIGS. 2 and 3, in general, the sensor data processor determines the volumetric intensity data from data measured by the sensor 160 at each (x, y, z) position visited by the platform 130. For example, as the controller 110 causes the build platform 130 to move about the x-y plane, the controller 110 causes the sensor 160 to measure an interference signal 261 (also referred to herein as raw OCT data or "scan data") for a surface region of the object under fabrication 121 for the current position (x, y, z) position of the build platform 130. In some examples, to do so, the sensor 160 projects low-coherence light onto the object under fabrication 121 and onto a scanning reference mirror (not shown), as is conventional in OCT. The projected light has a narrow bandwidth, and in each pulse of a series of pulses, the frequency or wavenumber is varied linearly over time during the duration of the pulse. A combination of reflected light from the object under fabrication 121 and the light reflected from the scanning reference mirror results in the interference signal 261, represented in the time domain. Due to the linear variation of the wavenumber, reflection at a particular distance results in constructive interference that varies periodically over the duration of the interference signal 261. The sensor data processor 111 of the controller 110 processes that interference signal 261 using a Fourier transform (e.g., a fast Fourier transform, FFT) 262 to determine volumetric intensity data 263 representing an intensity of the reflected light along the z axis for the current (x, y) position of the build platform 130. Very generally, the signal amplitude at each frequency in the volumetric intensity data 263 corresponds to the amount of light reflected at each depth measurement point.

In some examples, the measured volumetric intensity data for different (x, y, z) positions of the build platform is combined to form a volumetric profile representing material occupancy in a 3D volume of the object built on the platform. For example, for each point P in a 3D volume the volumetric profile specifies whether that point contains material or not. In some examples, the volumetric profile also stores partial occupancy of material for the point, as well as the type(s) of material occupying the point. In some examples, the volumetric profile is represented as a 3D discrete data structure (e.g., 3D array of data). For example, for each point P in the (x, y, z) coordinate space, a value of 1 is stored in the data structure if the point contains material and a value of 0 is stored in the data structure if the point does not contain material. Values between 0 and 1 are stored in the data structure to represent fractional occupancy.

To distinguish between different materials, the stored value for a particular point can denote material label. For example, 0—no material, 1—build material, 2—support material. In this case, to store fractional values of each material type, multiple volumes with fractional values may be stored. Since the data is typically associated with measurements at discrete (x, y, z) locations, continuous values can be interpolated (e.g., using tri-linear interpolation).

Furthermore, in some examples, the volumetric data in the volumetric profile is also associated with a confidence of the measurement. This is typically a value between 0 and 1. For example, 0 means no confidence in the measurement (e.g., missing data), 1 means full confidence in the data sample. Fractional values are also possible. The confidence is stored as additional volumetric data.

Figure 4:
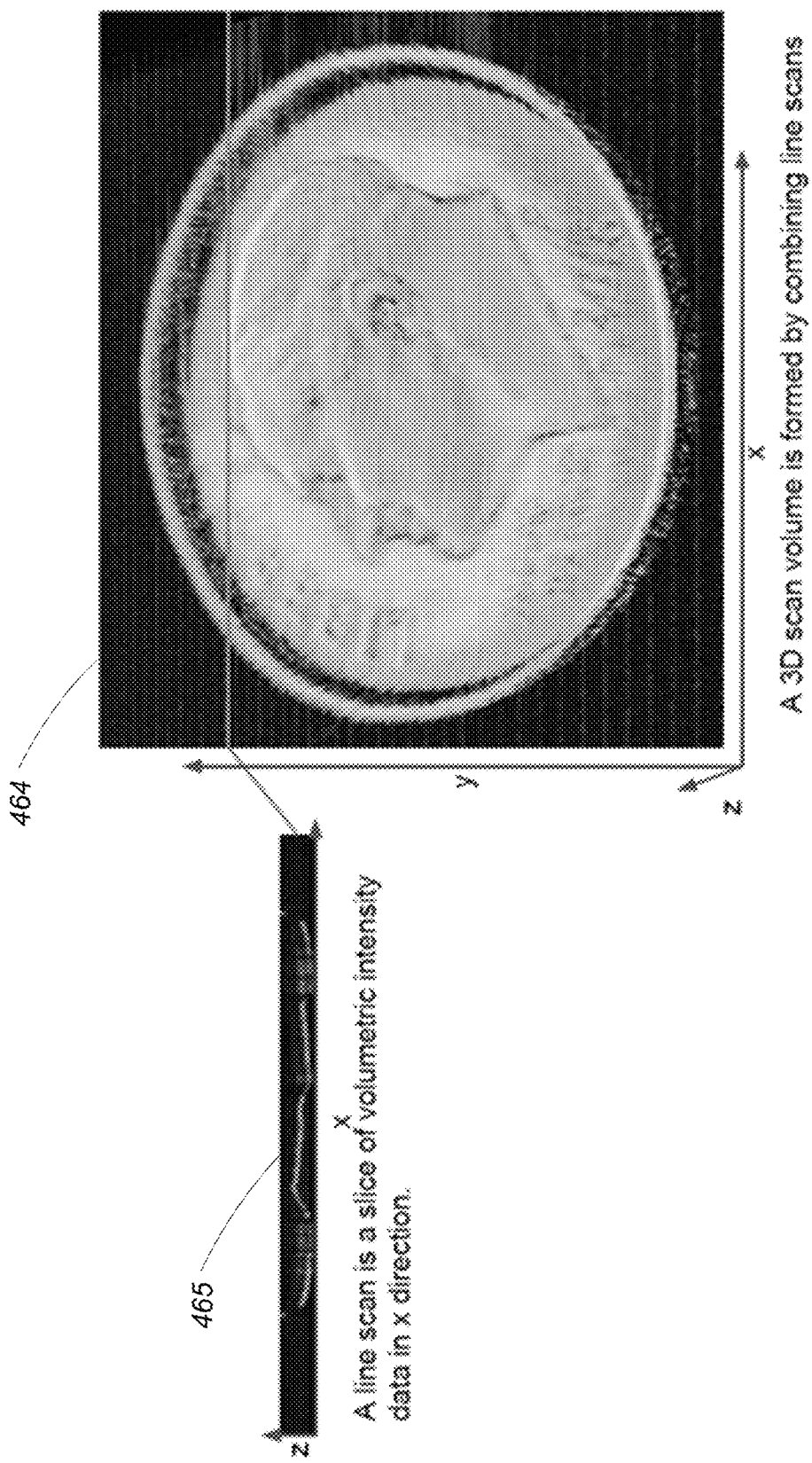
FIG. 4 is an example of a volumetric intensity profile.

Referring to FIG. 4, one example of a volumetric profile 464 includes volumetric intensity data for a number of (x, y, z) positions in the reference frame of a coin. In the figure, a slice of volumetric intensity data, taken in the x-direction is referred to as a "scan line." In this example, for each y-axis value, a number of the volumetric data along the x-axis for a single y-axis value is referred to as a "scan line" 465. The scan line shows, areas of higher volumetric intensity with lighter shading and areas of lower volumetric intensity with darker shading. Inspection of the scan line provides an indication of a surface geometry of the coin in the region of the scan line (e.g., by identifying a line of highest volumetric intensity across the scan line).

2.2 Surface Depth Determination

In some examples, a surface of an object is reconstructed from the raw OCT data 261 collected for the object under fabrication 121. For example, after computing a volumetric profile for an object, a topmost surface of the object can be reconstructed by finding a most likely depth (i.e., maximum z value) for each (x, y) position in the volumetric profile using a peak detection algorithm.

Referring to FIG. 5, in some examples, the volumetric intensity data 263 is processed by a first peak detection module 566 to determine a surface depth for the (x, y) position associated with the volumetric intensity data 263. In some examples, the first peak detection module 566 is configured to identify a first peak in the volumetric intensity data 263 (see FIG. 3) that exceeds a threshold (e.g., a predetermined threshold) and to determine the surface depth 567 corresponding to the identified first peak. In some examples, the first peak detection module 566 also determines a confidence level associated with the determined surface depth (e.g., based on a magnitude of the first major peak.)

Referring to FIG. 6, in other examples, before being processed by the FFT 262, the interference signal 261 is first processed by a linearization module 668 to generate a linearized interference signal 669, for example, to compensate for non-ideal sweeping of wavenumber over time. This linearized signa is then processed by a phase correction module 671 to generate linearized, phase corrected data 672, for example, to compensate for different dispersion effects on the signal paths of signals that are combined. The linearized, phase corrected data 672 is then provided to the FFT 262 to generate the volumetric intensity data 263.

In some examples, the determined depth data for different (x, y) positions is combined to form a "2.5D" representation in which the volumetric intensity data at a given (x, y) position is replaced with a depth value. In some examples, the 2.5D representation is stored as a 2D array (or multiple 2D arrays). In some examples, the stored depth value is computed from the volumetric intensity data, as is described above. In other examples, the stored depth value is closest occupied depth value from the volumetric intensity data (e.g., if the mapping is orthographic, for each (x, y) position the z value of the surface or the first voxel that contains material is stored). In some examples, material labels for the surface of an object are stored using an additional 2.5D array. In some examples, the reconstructed depth represented in the 2.5D representation is noisy and is filtered to remove the noise.

Referring to FIG. 7, one example of a volumetric profile 768 for an object is shown on the left-hand side of the page and one example of a depth representation 769 of the same object is shown on the right-hand side of the page.

3 Neural Network-based Depth Reconstruction

In some examples, some or all of the above-described steps in the process determining a 2.5D representation of a scanned geometry are replaced with a machine learning model represented as a neural network. Very generally, the machine learning model is trained in a training step (described below) to generate configuration data. In a runtime configuration, the neural networks described below are configured according to that configuration data.

3.1 Full Neural Network Processing

Referring to FIG. 8, in one example, the raw OCT data (i.e., the interference signal) 261 for a given (x, y) position is fed to a neural network 871. In general, the raw OCT data 261 is a sampled signal with n samples (e.g., n=100). The neural network 871 therefore has n inputs. The neural network 871 processes the raw OCT data and outputs a surface depth value 567 (and optionally a confidence measure). Optionally, the neural network 871 can also output the confidence of the its estimate. In this example, the neural network 871 internally computes operations equivalent to the Fourier Transform and peak detection (among other) operations.

Note that the arrangement in FIG. 8 does not include linearization and phase correction stages. To the extent that compensation is desirable to deal with non-ideal of the sweeping by wavenumber, or even intentional deterministic but non-linear sweeping, the neural network 871 may be trained to accommodate such characteristics. Similarly, the neural network may be trained to accommodate dispersion effects, thereby avoiding the need for a phase correction stage.

3.2 FFT Followed by Neural Network Processing

Referring to FIG. 9, in some examples the raw OCT data (i.e., the interference signal) 261 for a given (x, y) position is first fed to a Fast Fourier Transform (FFT) module 262 which computes the volumetric intensity data 263 for the given (x, y) position. The volumetric intensity data is then provided to a neural network 971, which processes the volumetric intensity data 263 outputs a surface depth value 567 (and optionally a confidence measure). Optionally, the neural network 971 can also output the confidence of the its estimate. In this example, the neural network 971 internally computes operation an operation equivalent to peak detection and other operations but leaves the FFT outside of the neural network 971. Because the FFT is a highly optimized procedure, it may be more efficient to use the neural network after FFT has been applied. It is noted that, in some examples additional spatial filtering (e.g., over a neighborhood of (x,y) locations) is applied.

Figure 10:
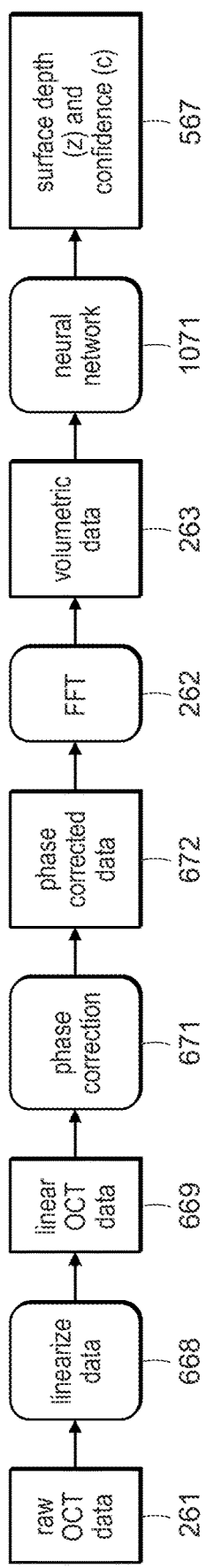
FIG. 10 is a third, partially neural network-based workflow for determining surface depth from raw OCT data.

3.3 Linearization and Phase Correction Prior to FFT and Neural Network Processing Referring to FIG. 10, in some examples, the raw OCT data (i.e., the interference signal) 261 for a given (x, y) position is pre-preprocessed before it is fed to the FFT module 262. For example, the raw OCT data 261 is first processed by a linearization module 668 to generate a linearized interference signal 669, which is then processed by a phase correction module 671 to generate linearized, phase corrected data 672. The linearized, phase corrected data 672 is provided to the FFT 262 to generate the volumetric intensity data 263. The volumetric intensity data is then provided to a neural network 971, which processes the volumetric intensity data 263 and outputs a surface depth value 567 (and optionally a confidence measure).

3.4 Linearization Prior to Neural Network Processing

Figure 11:
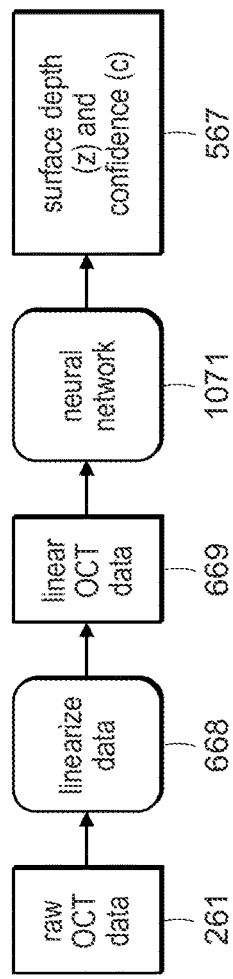
FIG. 11 is a fourth, partially neural network-based workflow for determining surface depth from raw OCT data.

Referring to FIG. 11, in some examples, the raw OCT data (i.e., the interference signal) 261 for a given (x, y) position is linearized before it is fed to a neural network 1171. For example, the raw OCT data 261 is first processed by a linearization module 668 to generate a linearized interference signal 669. The linearized interference signal 669 is provided to a neural network 971, which processes the linearized interference signal 669 and outputs a surface depth value 567 (and optionally a confidence measure). In this example, the neural network 1171 performs an equivalent of phase correction, a Fourier transform, and peak finding.

3.5 Linearization and Phase Correction Prior to Neural Network Processing

Figure 12:
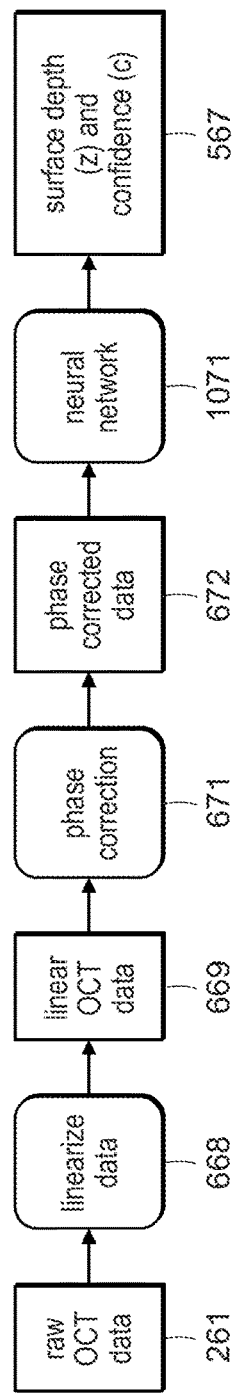
FIG. 12 is a fifth, partially neural network-based workflow for determining surface depth from raw OCT data.

Referring to FIG. 12, in some examples, the raw OCT data (i.e., the interference signal) 261 for a given (x, y) position is linearized and phase corrected before it is fed to a neural network 1271. For example, the raw OCT data 261 is first processed by a linearization module 668 to generate a linearized interference signal 669, which is then processed by a phase correction module 671 to generate linearized, phase corrected data 672. The linearized, phase corrected data 672 is provided to a neural network 1271, which processes the linearized, phase corrected interference signal 672 and outputs a surface depth value 567 (and optionally a confidence measure). In this example, the neural network 1171 performs an equivalent of a Fourier transform and peak finding.

3.6 Neural Network Processing Algorithm with Expected Depth or Depth Range

In some examples, when an estimate of the surface depth (or depth range) is available, the estimate is provided as an additional input to guide the neural network. For example, when the system has approximate knowledge of the 3D model of the object under fabrication, that approximate knowledge is used by the neural network.

In the context of a 3D printing system with a digital feedback mechanism, the expected depth or depth range can be computed in a straightforward manner. In this additive fabrication method, scanning and printing are interleaved. The algorithm can store depth values computed at the previous iteration. It also has access to the information whether the printing method has printed a layer at a given (x, y) position and expected thickness of the layer.

Figure 13:
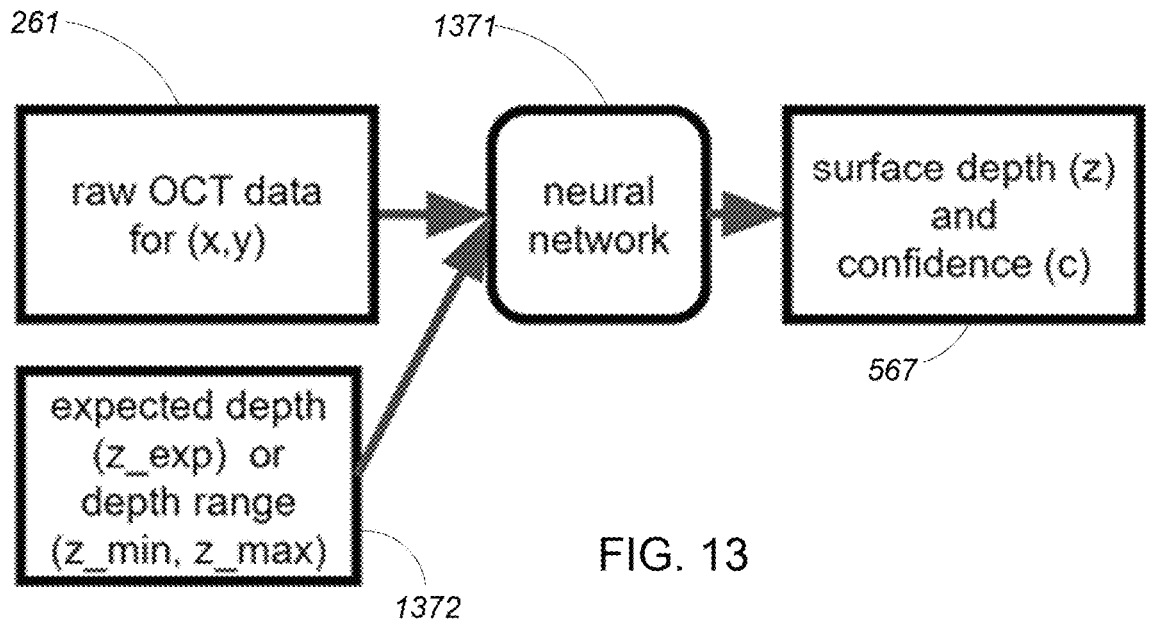
FIG. 13 is a sixth neural network-based workflow for determining surface depth from raw OCT data using expected depth information.

Referring to FIG. 13, both the raw OCT data (i.e., the interference signal) 261 for a given (x, y) position and the expected surface depth (or depth range) 1372 for the given (x, y) position are provided to a neural network 1371. The neural network 1371 processes the raw OCT data (i.e., the interference signal) 261 and the expected surface depth (or depth range) 1372 and outputs a surface depth value 567 (and optionally a confidence).

3.7 Neural Network Processing Algorithm with Spatial Neighborhood

In some examples, rather than providing the raw OCT data 261 for a single (x, y) position to a neural network in order to compute the surface depth value for that (x, y) position, raw OCT data for a spatial neighborhood around that single (x, y) position are provided to the neural network. Doing so reduces noise and improves the quality of the computed surface depth values because, for example, it is able to remove sudden jumps on the surface caused by over-saturated data or missing data has access to more information. For example, a 3×3 or 5×5 neighborhood if interference signals can be provided as input to the neural network.

Figure 14:
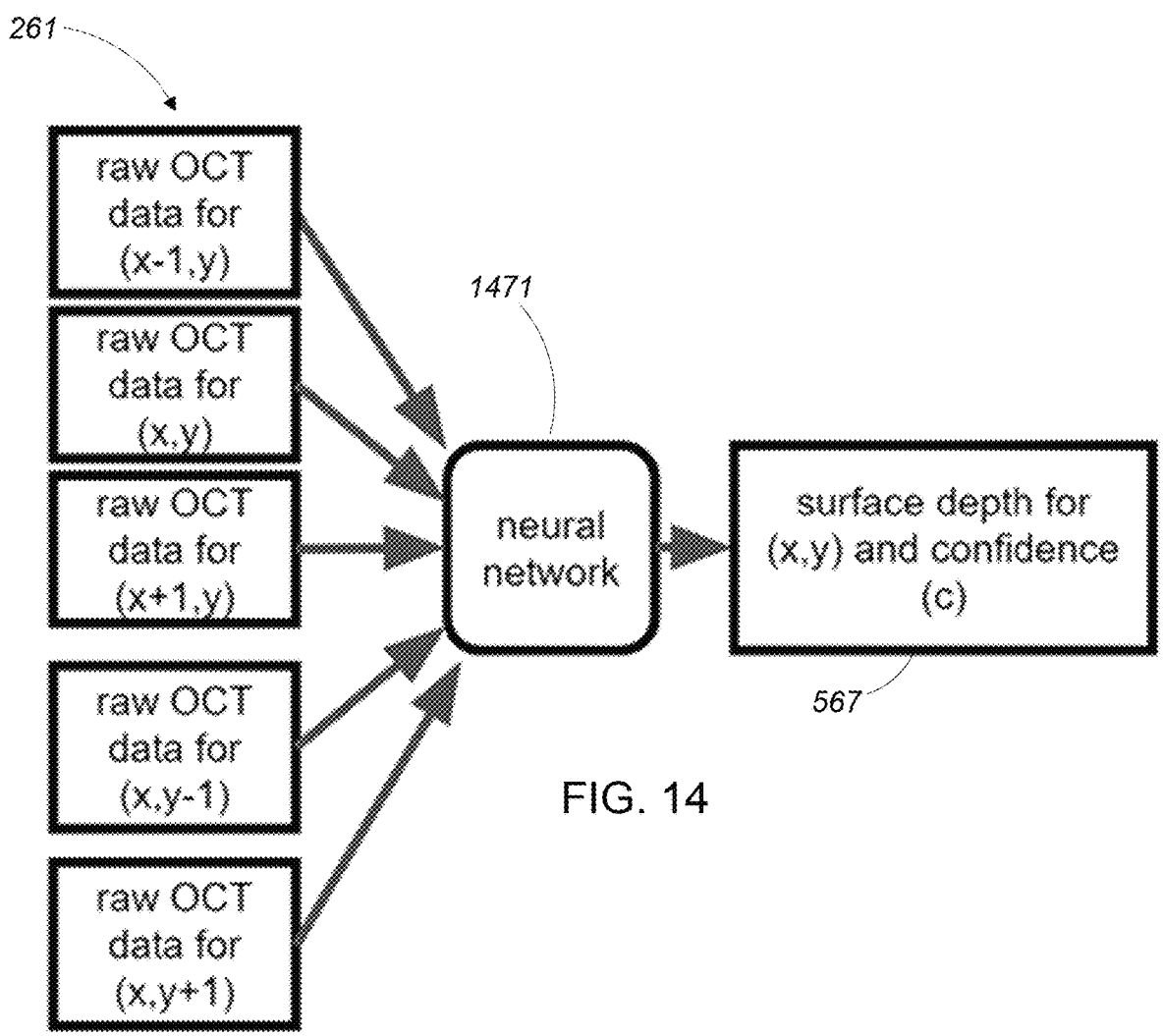
FIG. 14 is a seventh neural network-based workflow for determining surface depth from raw OCT data using a spatial neighborhood.

Referring to FIG. 14, the raw OCT data (i.e., the interference signal) 261 for a given (x, y) position and it's neighboring spatial positions (x−1,y), (x+1,y) (x, y−1), and (x, y+1) are provided to a neural network 1471. The neural network 1471 processes the raw OCT data 261 for the given (x, y) position and the provided spatial neighbors and outputs a surface depth value 567 for the given (x, y) position (and optionally a confidence).

3.8 Neural Network Processing Algorithm with Spatial Neighborhood and Expected Depth In some examples, an expected surface depth or surface depth range is provided to a neural network along with the raw OCT data (i.e., the interference signal) 261 for a given (x, y) position and its neighboring spatial positions. This is possible, for example, when the 3D model of the object under fabrication is approximately known.

Figure 15:
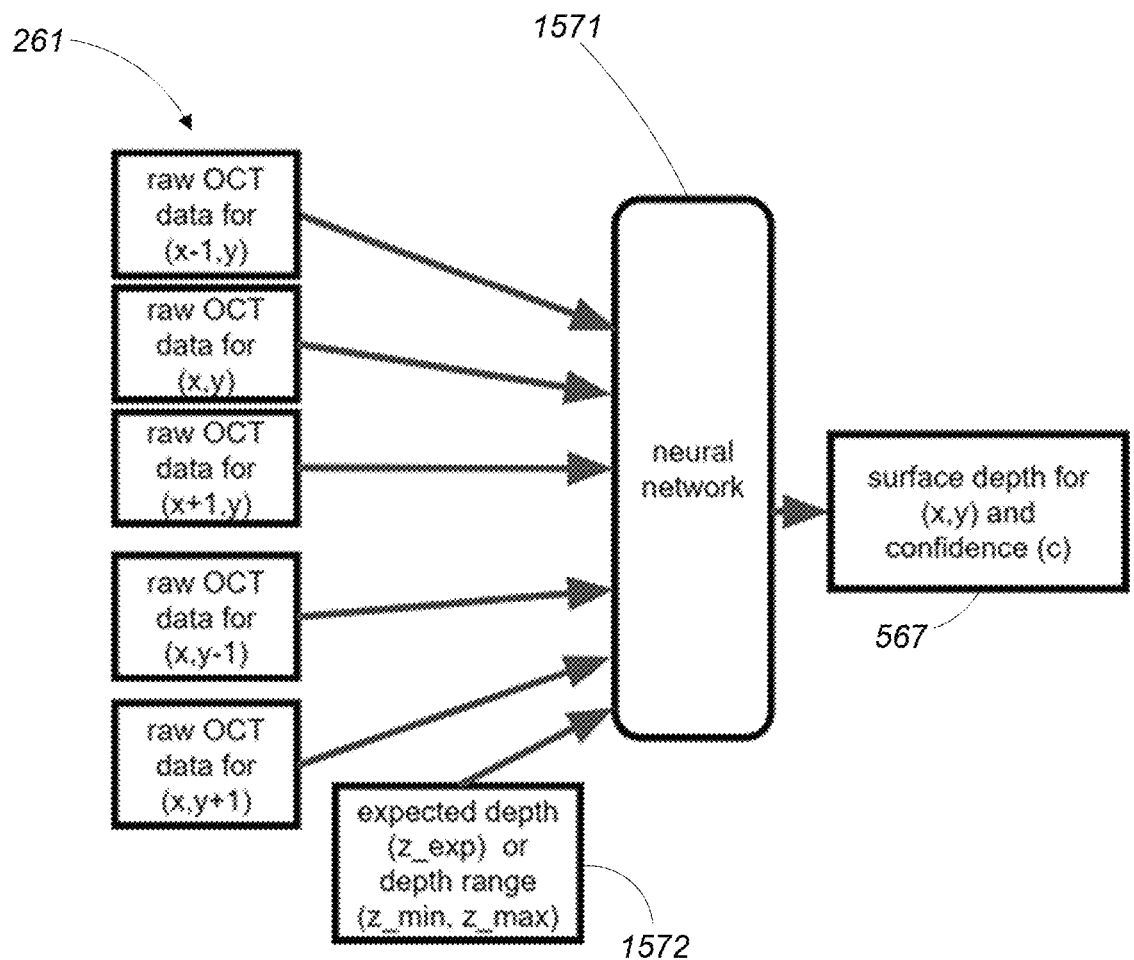
FIG. 15 is an eighth neural network-based workflow for determining surface depth from raw OCT data using expected depth information and a spatial neighborhood.

Referring to FIG. 15, the raw OCT data (i.e., the interference signal) 261 for a given (x, y) position and it's neighboring spatial positions (x−1,y), (x+1,y), (x, y−1), and (x, y+1) are provided to a neural network 1571. The expected depth (or depth range) 1572 is also provided to the neural network 1571. The neural network 1571 processes the raw OCT data 261 for the given (x, y) position and the provided spatial neighbors along with the expected depth (or depth range) 1572 and outputs a surface depth value 567 for the given (x, y) position (and optionally a confidence).

This is also applicable in additive fabrication systems that include a feedback loop. Those systems have access to a 3D model of the object under fabrication, previous scanned depth, print data sent to the printer, and expected layer thickness.

Figure 16:
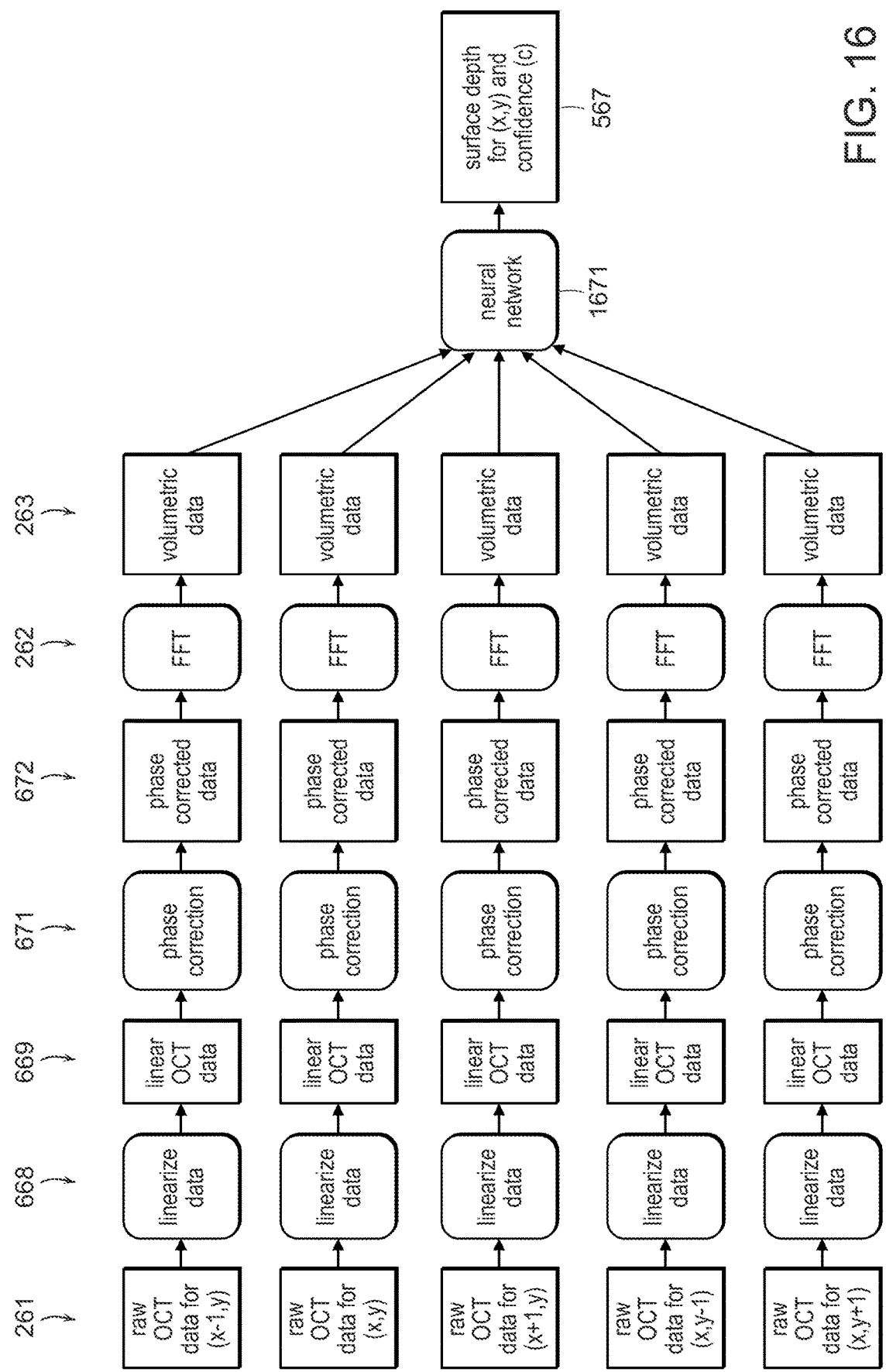
FIG. 16 is a ninth neural network-based workflow for determining surface depth from raw OCT data using multiple processing pipelines to process a spatial neighborhood.

3.9 Linearization and Phase Correction Prior to Neural Network Processing with Spatial Neighborhood Referring to FIG. 16, in some examples, the raw OCT data (i.e., the interference signal) 261 for a given (x, y) position and it's neighboring spatial positions (x−1,y), (x+1,y), (x, y−1), and (x, y+1) are processed in separate, individual processing pipelines to determine their corresponding volumetric data 263.

In each processing pipeline, the raw OCT data (i.e., the interference signal) 261 pre-preprocessed before it is fed to the FFT module 262. For example, the raw OCT data 261 is first processed by a linearization module 668 to generate a linearized interference signal 669, which is then processed by a phase correction module 671 to generate linearized, phase corrected data 672. The linearized, phase corrected data 672 is provided to the FFT 262 to generate the volumetric intensity data 263.

The volumetric intensity data 263 for each instance of the raw OCT data (i.e., the output of each of the processing pipelines) is then provided to a neural network 1671, which processes the volumetric intensity data 263 and outputs a surface depth value 567 (and optionally a confidence). As was noted above, spatial neighborhoods of different footprints/stencils can be used (e.g., 3×3, 5×5, etc.).

3.10 Dual Neural Network Processing Algorithm

Figure 17:
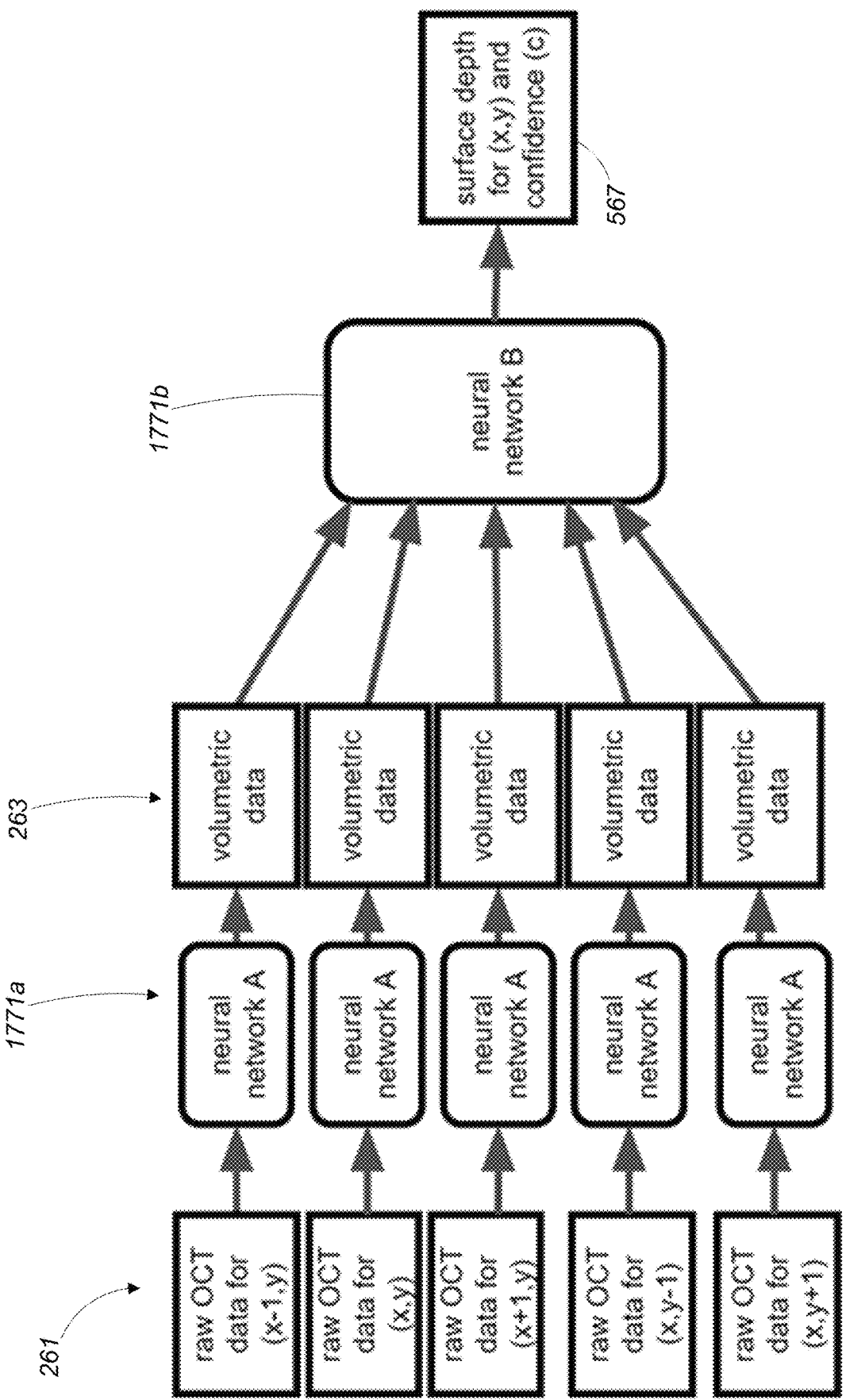
FIG. 17 is a tenth, multiple neural network-based workflow for determining surface depth from raw OCT data.

In some examples, a series of two (or more) neural networks are used to compute the surface depth for a given (x, y) position. Referring to FIG. 17, the raw OCT data (i.e., the interference signal) 261 for a given (x, y) position and it's neighboring spatial positions (x−1,y), (x+1,y), (x, y−1), and (x, y+1) are processed in separate, individual processing pipelines to determine their corresponding volumetric intensity data.

In each processing pipeline, the raw OCT data 261 is provided to a first neural network 1771a, which processes the raw OCT data 261 to determine volumetric data 263 for the given (x, y) position and its neighboring spatial positions. The volumetric data 263 generated in each of the pipelines is provided to a second neural network 1771b, which processes the volumetric intensity data 263 from each pipeline and outputs a surface depth value 567 (and optionally a confidence).

In some examples, this approach is computationally efficient. The overall/combined architecture is deeper but less wide. The computation of the first neural network 1771a is completed and then stored. Both neural networks can be trained at the same time.

Figure 18:
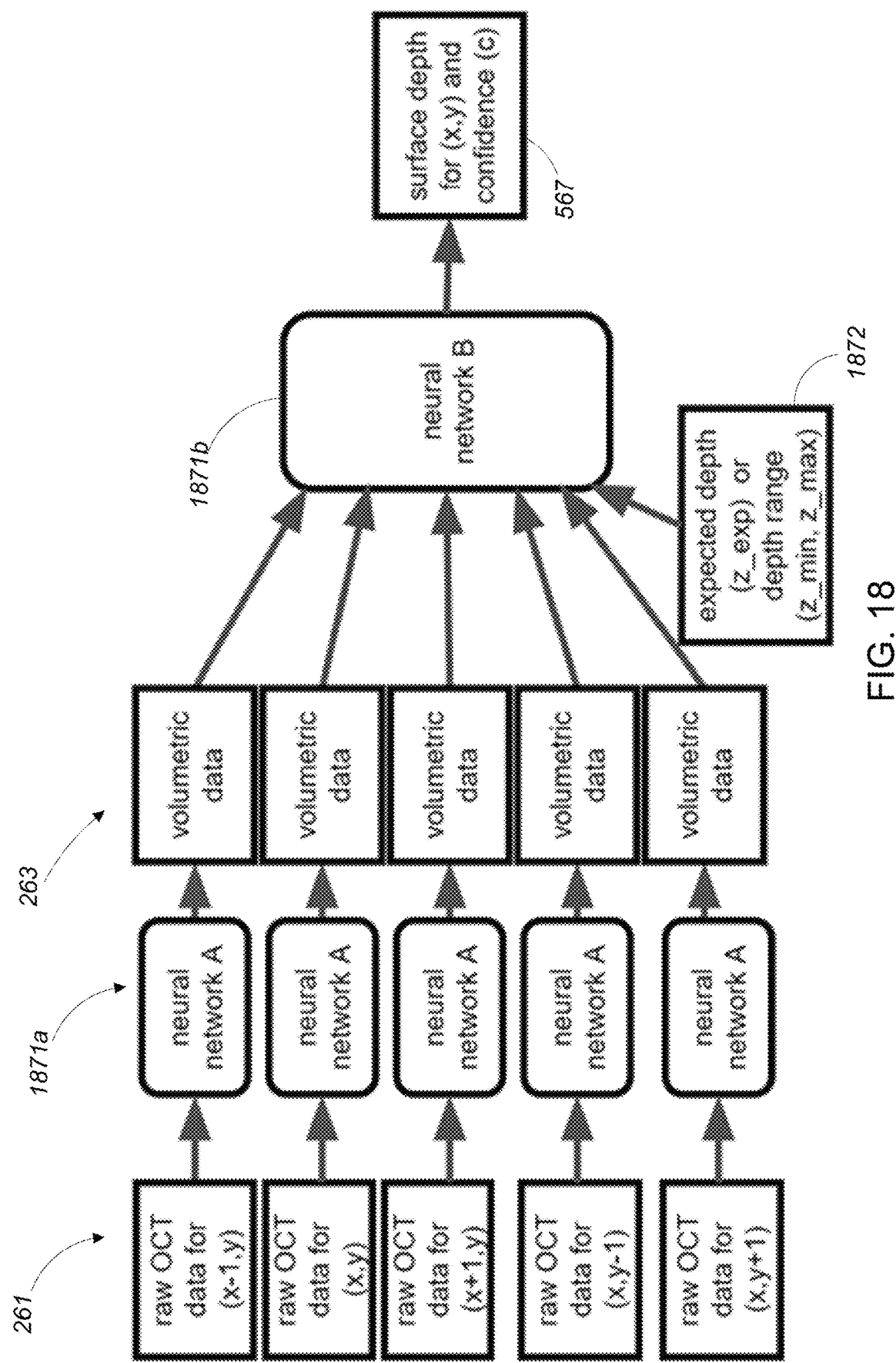
FIG. 18 is an eleventh, multiple neural network-based workflow for determining surface depth from a spatial neighborhood of raw OCT data and expected depth information.

Referring to FIG. 18, in some examples, a configuration similar to that shown in FIG. 17 is modified such that the the second neural network 1871b also takes an expected depth value or depth range for the given (x, y) position as input. This is specifically useful for using the algorithm for additive fabrication feedback loop or when the 3D model of the scanned object is approximately known.

4 Neural Network Training

Figure 19:
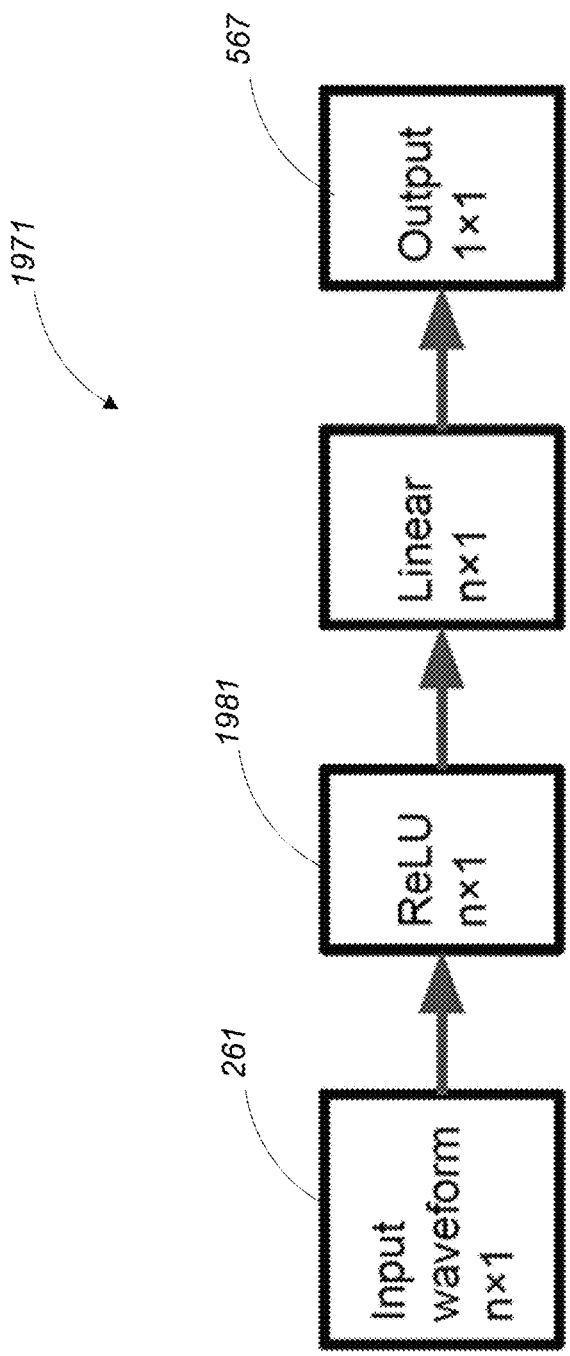
FIG. 19 is a neural network configuration.

Referring to FIG. 19, in some examples the neural networks described above are implemented using one or more hidden layers 1981 with Rectified Linear Unit (ReLU) activations. For example, the neural network 1971 is configured with one hidden layer 1981 for computing a surface depth value from a of a neural network from raw OCT input.

Standard loss functions can be used (e.g., $L_0, L_1, L_2, L_{inf}$) can be used when training the neural networks. In some examples, the networks are trained using input, output pairs computed with a standard approach or using a temporal tracking approach. Generally, the neural network is trained using a backpropagation algorithm and a stochastic gradient descent algorithm (e.g., ADAM). In this way, the surface values for each (x, y) position are calculated. The values might be noisy and additional processing (e.g., filtering) of the surface data can be employed (as is described above). The computed confidence values can be used in the filtering process.

In some examples, the input training data is obtained using a direct dept computation process (e.g., using the scanning methodologies described above), which may optionally be spatially smoothed to suppress noise. In some examples, the input training data is obtained from scans of an object with a known geometry (e.g., a coin with a known ground truth geometry. In yet other examples, the input training data is obtained as either 2.5D or 3D data provided by another (possibly higher accuracy) scanner.

5 Implementations

The printer shown in FIG. 1 is only an example, and other printer arrangements that may be used are described for example, in U.S. Pat. No. 10,252,466, "Systems and methods of machine vision assisted additive fabrication," U.S. Pat. No. 10,456,984, "Adaptive material deposition for additive manufacturing," U.S. Pat. Pub. 2018/0056582, "System, Devices, and Methods for Injet-Based Three-Dimensional Printing," as well as in Sitthi-Amore et al. "MultiFab: a machine vision assisted platform for multi-material 3D printing." ACM Transactions on Graphics (TOG) 34, no. 4 (2015): 129. The above-described estimation of depth data may be integrated into the feedback control process described in co-pending U.S. Pat. Pub. 2016/0023403 and 2018/0169953. All of the aforementioned documents are incorporated herein by reference An additive manufacturing system typically has the following components: a controller assembly is typically a computer with processor, memory, storage, network, IO, and display. It runs a processing program. The processing program can also read and write data. The controller assembly effectively controls the manufacturing hardware. It also has access to sensors (e.g., 3D scanners, cameras, IMUs, accelerometers, etc.).

More generally, the approaches described above can be implemented, for example, using a programmable computing system executing suitable software instructions or it can be implemented in suitable hardware such as a field-programmable gate array (FPGA) or in some hybrid form. For example, in a programmed approach the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of dataflow graphs. The modules of the program (e.g., elements of a dataflow graph) can be implemented as data structures or other organized data conforming to a data model stored in a data repository.

The software may be stored in non-transitory form, such as being embodied in a volatile or non-volatile storage medium, or any other non-transitory medium, using a physical property of the medium (e.g., surface pits and lands, magnetic domains, or electrical charge) for a period of time (e.g., the time between refresh periods of a dynamic memory device such as a dynamic RAM). In preparation for loading the instructions, the software may be provided on a tangible, non-transitory medium, such as a CD-ROM or other computer-readable medium (e.g., readable by a general or special purpose computing system or device), or may be delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

In general, some or all of the algorithms described above can be implemented on an FPGA, a GPU, or CPU or any combination of the three. The algorithm can be parallelized in a straightforward way.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A method for determining estimated depth data for an object comprising:
    scanning the object to produce scan data corresponding to a surface region of the object using a first scanning process;
    configuring an artificial neural network with first configuration data corresponding to the first scanning process; and
    providing the scan data as an input to the configured artificial neural network to yield the estimated depth data as an output, the estimated depth data representing a location of a part of the object in the surface region; and
    determining a surface geometry of the object based at least in part on the estimated depth data.

2. The method of claim 1 wherein the object comprises an object under 3D additive fabrication according to a first fabrication process.

3. The method of claim 2 wherein the first configuration data corresponds to the first scanning process as well as the first fabrication process.

4. The method of claim 3 wherein configuring an artificial neural network with first configuration data comprising selecting said first configuration data from a set of available configuration data each associated with a different scanning and/or fabrication process.

5. The method of claim 1 further comprising:
    determining expected depth data for the surface region of the object; and
    providing the expected depth data with the scan data to the configured artificial neural network.

6. The method of claim 5 wherein the expected depth data includes a range of expected depths.

7. The method of claim 1 wherein scanning the object comprises optically scanning the object at the location on the surface of the object.

8. The method of claim 7 wherein scanning the object comprises optically scanning the object over a plurality of locations on the surface region of the object.

9. The method of method of claim 7 wherein scanning the object comprises scanning the object using optical coherence tomography.

10. The method of claim 1 wherein scanning the object further comprises processing raw scan data according to one or more of (1) a linearization procedure, (2) a spectral analysis procedure, and (3) a phase correction procedure to produce the scan data.

11. The method of claim 1 further comprising transforming the scan data from a time domain representation to a frequency domain representation prior to providing the scan data as input to the artificial neural network.

12. The method of claim 1 wherein the configured artificial neural network further yields a confidence measure associated with the estimated depth data.

13. The method of claim 1 further comprising providing scan data for a spatial neighborhood associated with the surface region of the object as input to the configured artificial neural network.

14. The method of claim 13 wherein the spatial neighborhood includes a plurality of parts of the object in the surface region.

15. A system for determining estimated depth data for an object comprising:
   a sensor for scanning the object to produce scan data corresponding to a surface region of the object using a first scanning process;
   an artificial neural network configured with first configuration data corresponding to the first scanning process, the artificial neural network configured to determine the estimated depth data representing a location of a part of the object in the surface region, the artificial neural network having,
      one or more inputs for receiving the scan data, and
      an output for providing an estimated depth data; and
   one or more processors configured to determine a surface geometry of the object based at least in part on the estimated depth data.

16. A method for determining estimated depth data for an object comprising:
   scanning the object to produce scan data corresponding to a surface region of the object using a first scanning process;
   configuring a first artificial neural network with first configuration data corresponding to the first scanning process;
   configuring a second artificial neural network with second configuration data corresponding to the first scanning process;
   providing the scan data as an input to the configured first artificial neural network to yield volumetric data representing a location of a part of the object in the surface region;
   providing the volumetric data to the configured second neural network to yield the estimated depth data as an output, the estimated depth data representing the location of the part of the object in the surface region; and
   determining a surface geometry of the object based at least in part on the estimated depth data.

17. The method of claim 16 further comprising:
   determining expected depth data for the surface region of the object; and
   providing the expected depth data with the scan data to the configured second artificial neural network.

18. The method of claim 16 wherein the expected depth data includes a range of expected depths.

19. A method comprising:
   successively depositing layers of material to form a partially fabricated object, thereby increasing a thickness of the partially fabricated object along a depth axis of the object;
   for each of at least some of the deposited layers, after depositing the layer, scanning the object to produce scan data including volumetric information along the depth axis of the object;
   providing the scan data as an input to an artificial neural network configured using configuration data determined in a prior scanning process to yield estimated depth data as an output, the estimated depth data representing a location on a surface layer of the object along the depth axis; and
   determining a surface geometry of the object based at least in part on the estimated depth data.

* * * * *